United States Patent [19]

Hunt

[11] Patent Number: 5,238,225
[45] Date of Patent: Aug. 24, 1993

[54] METHOD AND APPARATUS FOR PULLING UNDERGROUND ELECTRICAL CABLE

[75] Inventor: James L. Hunt, Fort Worth, Tex.

[73] Assignees: Dorothy J. Hevron; Robert D. Doran, both of Ft. Worth, Tex.

[21] Appl. No.: 767,139

[22] Filed: Sep. 27, 1991

[51] Int. Cl.⁵ ............................................. B63B 35/03
[52] U.S. Cl. .............................. 254/134.3 FT; 242/95; 254/134.5; 254/328
[58] Field of Search ............... 254/134.3 FT, 134.5, 254/134.3 R, 323, 325, 328; 242/95

[56] References Cited

U.S. PATENT DOCUMENTS

| | | |
|---|---|---|
| 1,631,432 | 6/1927 | Schuetz . |
| 1,642,630 | 9/1927 | Sjolander . |
| 1,707,028 | 3/1929 | Seeger . |
| 2,527,634 | 10/1950 | Groves . |
| 2,537,522 | 1/1951 | Fries et al. . |
| 3,126,168 | 3/1964 | Huwe ................................ 242/86.5 |
| 3,226,088 | 12/1965 | Harbighorst ................. 254/134.3 R |
| 4,742,971 | 5/1988 | Wallace . |
| 4,836,466 | 6/1989 | Peterson . |

*Primary Examiner*—Bruce M. Kisliuk
*Assistant Examiner*—Eileen Morgan
*Attorney, Agent, or Firm*—James E. Bradley

[57] ABSTRACT

A method of pulling electrical cable through an underground tubular conduit includes providing a backhoe with a boom and positioning the backhoe outside of the electrical housing building. The operator mounts a pulley to the end of the boom and inserts the boom into an open portal. The operator mounts a take-up reel to the backhoe and reeves the pull line through the pulley and around the take-up drum. Rotating the backhoe wheel will pull the electrical cable secured to the pull line through the conduit. The take-up drum utilizes inner and outer support flanges and drum bolts for extending through holes provided in the backhoe wheel.

2 Claims, 2 Drawing Sheets

METHOD AND APPARATUS FOR PULLING UNDERGROUND ELECTRICAL CABLE

BACKGROUND OF THE INVENTION

1. Field of the invention

This invention relates in general to winches, and in particular to a winch apparatus and method for pulling underground cable through conduit during installation.

2. Description of the Prior Art

Contractors commonly utilize underground electrical power cable. The electrical power cable will be enclosed within an underground plastic conduit. Ends of the electrical cable will terminate in electrical housings at various locations.

When installing the underground electrical cable system, normally the contractor will thread a rope or pull line into the plastic pipe as the plastic pipe is being assembled and buried. When the plastic pipe has been completely buried, the pull line will have ends exposed at the surface. The contractor then connects one of the ends of the pull line to a reel of electrical cable. The contractor pulls on the other end of the pull line to draw the electrical cable through the conduit.

Often, the length of electrical cable to be pulled makes pulling by hand a very difficult task. It takes several workers. Pulling by a powered winch is not possible in many cases. Typically each of the ends of the pull line will be located within small electrical housing buildings. These small buildings will house various switches and other circuitry associated with electrical system. While the buildings have at least one portal or door, normally the roof is not removable.

Powered winches small enough to be placed in the building for pulling electrical cable are not commercially available. Winches mounted on trucks or other vehicles can not be placed within the building. Consequently, a conventional powered winch cannot readily access one end of the pull line for pulling the pull cable. Normally a contractor will utilize a large number of workers for manually pulling the line. This is time consuming and expensive.

SUMMARY OF THE INVENTION

In this invention, the operator may utilize a conventionally backhoe for mechanically performing the pulling in of the pull line. The operator mounts a take-up drum to a rear wheel of the backhoe. The operator removes the bucket from the backhoe and installs a pulley. The operator threads the pull line over the pulley and reeves it around the take-up drum. The operator positions the backhoe outside the electrical housing building, and inserts the boom through the open portal with the pulley located above the end of the electrical conduit. Rotating the rear wheel draws the pull cable over the take-up drum to pull the electrical cable through the underground conduit.

After the electrical cable has been pulled, in the preferred embodiment, the operator then reverses the wheel to unwind the pull line. The operator mounts a storage drum to the take-up drum. The operator then reeves the pull cable on the storage drum and rotates the wheel again to wind the pull line on the storage drum. The storage drum is then removed for later use.

In the preferred embodiment, the take-up drum has inner and outer drum flanges. A cylinder extends between the inner and outer drum flanges and encircles lug bolts of the wheel of the backhoe. Inner and outer support flanges extend between the inner drum flange and the backhoe wheel. Drum bolts mount to the inner and outer support flanges and extend through holes provided in the wheel.

DETAILED DESCRIPTION OF THE INVENTION

Figure 1:
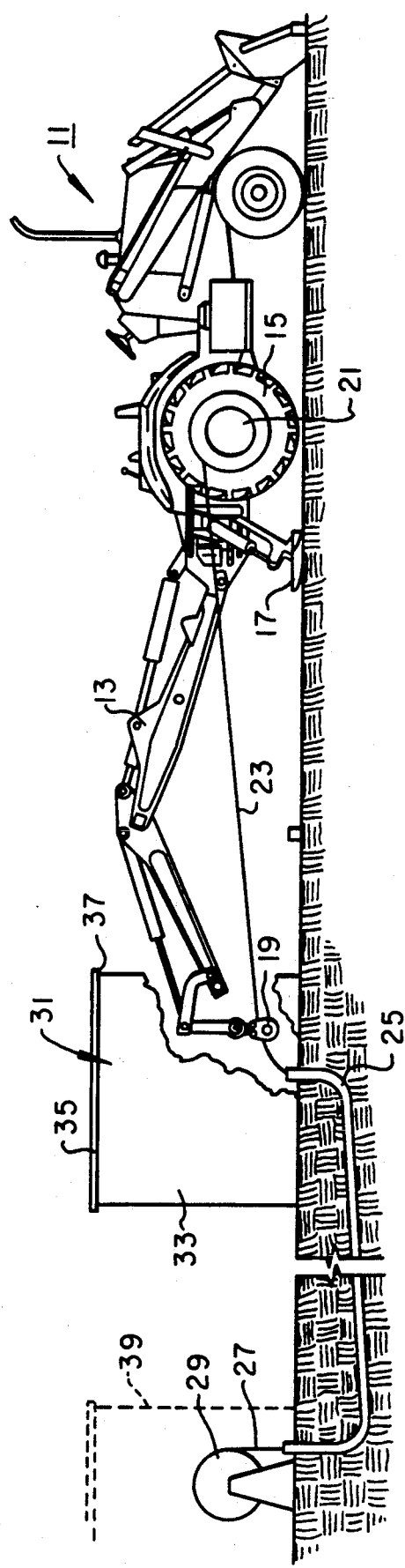
FIG. 1 is a side, schematic view illustrating a method of pulling underground electrical cable in accordance with this invention.

Referring to FIG. 1, backhoe 11 will be of a conventional type typically used for excavating or performing a variety of tasks. Backhoe 11 is a tractor that has a boom 13 mounted to the rear. Boom 13 is articulated and hydraulically controlled by the operator. Backhoe 11 has two rear wheels 15 which are driven to move the backhoe 11. A lifting mechanism 17 will lift the rear end of the backhoe 11 to space one or both of the wheels 15 above the ground. At that time, the engine of the backhoe 11 will be able to spin the rear wheel 15 that is spaced above the ground.

For use with the method, the operator will remove the bucket (not shown) from the end of boom 13. The bucket will be typically a scoop-shaped device having teeth used for digging trenches. The operator suspends a pulley 19 to the end of boom 13 by a shackle or the like.

The operator also will mount a take-up drum 21 to one of the rear wheels 15. The operator will mount the take-up drum 21 so that it will rotate in unison with the wheel 15 when driven by the engine of backhoe 11.

To perform the method, a contractor will previously have threaded a pull line 23 through a length of plastic conduit 25. The pull line 23 will be a rope or cable of some type. The conduit 25 is typically plastic and will be buried underground. The pull line 23 is threaded through the individual sections of conduit 25 as the ends of the conduit are being joined and buried. The conduit 25 will have first and second ends exposed at the surface. The operator connects the first end of the pull line 23 to an electrical cable 27. Cable 27 is typically mounted on a rotatable reel 29.

The second end of the conduit 25 will be normally located within a building 31. Building 31 is a small structure typically about five or six feet in height for containing switches and other electrical equipment. Building 31 is rectangular, having four sidewalls 33 and a roof 35. A portal or door 37 locates on one of the sidewalls 33, and may comprise the entire sidewall on that side. A similar building 39 may be enclosing the reel 29 of electrical cable 27.

The operator will move the boom 13 such that the end extends through the door 37. The pulley 19 will be located somewhere above the end of conduit 25, though not necessarily directly above. The operator reeves the pull line 23 over the take-up drum 21. The operator then rotates wheel 15 to wind the pull line 23 around the take-up drum 21. This will pull the electrical cable 27 through the conduit 25.

Figure 2:
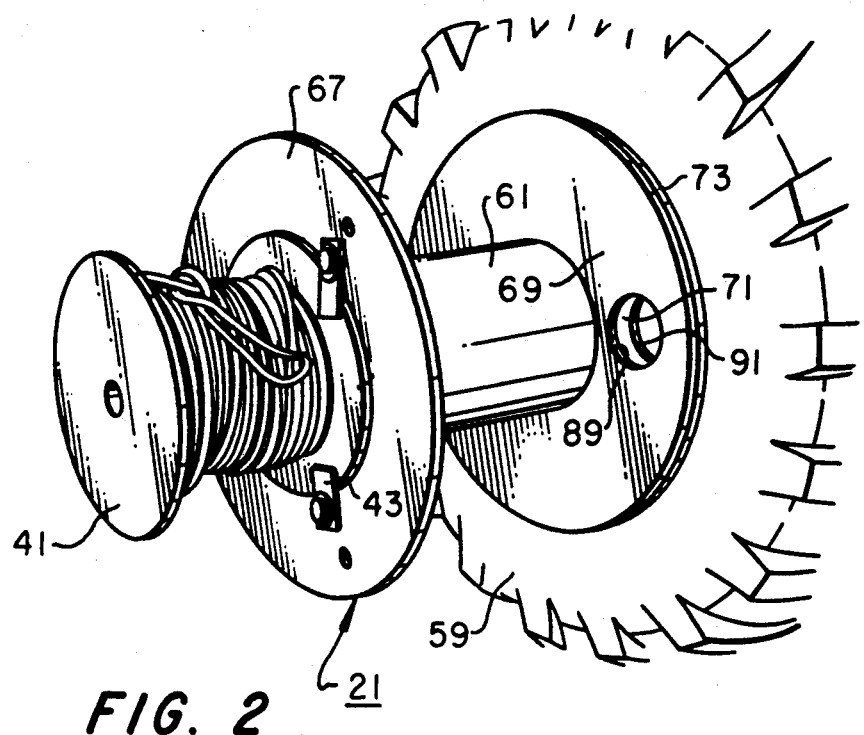
FIG. 2 is a perspective view of a take-up drum and a storage drum utilized with the method of FIG. 1.

Once completed, referring to FIG. 2, the operator will then rotate the wheel 15 in reverse. Workers will physically pull the pull line 23 off the take-up drum 21 as the operator rotates the wheel. The workers will install a storage drum 41 to the take-up drum 21. The storage drum 41 is smaller and lighter in weight than the take-up drum 21.

A means for releasably mounting the storage drum 41 to the take-up drum 21 may comprise a pair of brackets 43 pivotally mounted to the outer side of the take-up drum 21. Brackets 43 will hold one flange of the storage drum 41 to the take-up drum 21 so that it will rotate in unison with the take-up drum 21. The operator then rotates the wheel 15 in a take-up direction and winds the pull line 23 onto the storage drum 41. Once complete, the operator will then pivot the brackets 43 to remove the storage drum 41 for later use.

Figure 3:
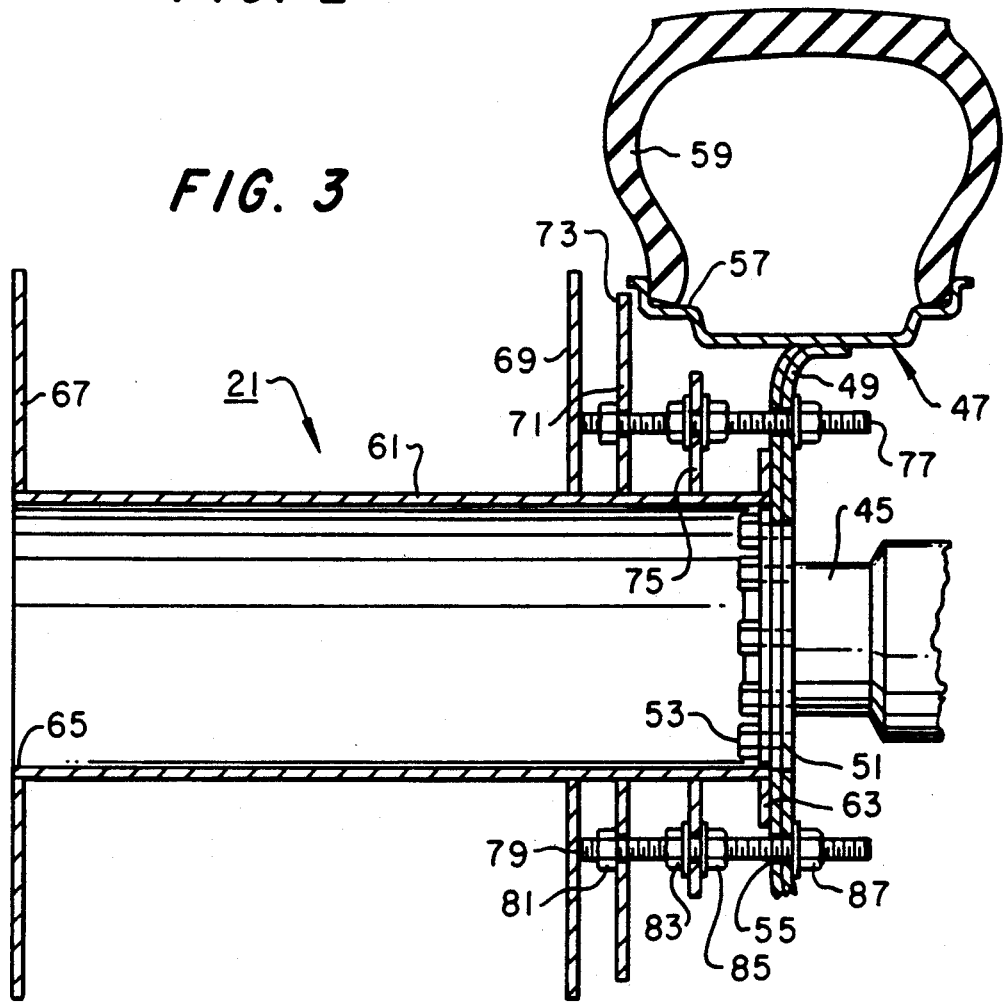
FIG. 3 is a sectional view illustrating the take-up drum of FIG. 2.

FIG. 3 illustrates a preferred embodiment of the take-up drum 21. The backhoe 11 will have an axle 45. A wheel 47 mounts to axle 45. Wheel 47 has a central plate 49. A plurality of lug bolt holes 51 extend through the center area of the central plate 49. Lug bolts 53 extend through the lug bolt holes 51 to hold the wheel 47 on the axle 45.

A plurality of drum bolt holes 55 extend through the central plate 49 of wheel 47. Drum bolt holes 55 are located in a circumferential array and spaced radially farther from the axle 45 than the lug bolt holes 51. Preferably there are at least four of the drum bolt holes 55. Each drum bolt hole 55 is radially located between the lug bolt holes 51 and the rim 57 of the wheel 47. A tire 59 will mount to rim 57.

Take-up drum 21 includes a cylinder 61. Cylinder 61 is hollow and has an abutment flange 63 on its inner end. Abutment flange 63 is a circular flange extending perpendicular to the axis of cylinder 61. Abutment flange 63 mates in flush contact with the central plate 49. The diameter of cylinder 61 is sufficiently large such that the heads of the lug bolts 53 will locate entirely within cylinder 61. Cylinder 61 has an open outer end 65. The operator has access, if needed, to the lug bolts 53 through the open outer end 65.

Take-up drum 21 has an outer drum flange 67 which extends radially from the open outer end 65 of cylinder 61. An inner drum flange 69 is parallel to the outer drum flange 67 and spaced inward therefrom. Inner drum flange 69 is located between the abutment flange 63 and the outer drum flange 67. Inner drum flange 69 has approximately the same diameter as outer drum flange 67, and when installed, will be substantially vertically aligned with an outer edge of tire 59.

An outer support flange 71 locates between abutment flange 63 and inner drum flange 69. Outer support flange 71 is of a smaller diameter than inner drum flange 69. Its periphery 73 is circular and is closely spaced within the outer extremity of rim 57.

An inner support flange 75 locates between abutment flange 63 and outer support flange 71. Inner support flange 75 is of smaller diametrical dimension than the outer support flange 71. In the preferred embodiment, its periphery is polygonal, rather than circular. Inner support flange 75 is parallel with abutment flange 63, outer drum flange 67, inner drum flange 69, and outer support flange 71.

A plurality of drum bolts 77 extend through the drum bolt holes 55 and through apertures provided in the outer support flange 71 and inner support flange 75. The apertures in the flanges 71, 75 align with each other in an axial direction so that the drum bolts 77 will be parallel with the axle 45 and spaced in a circumferential array around axle 45. The drum bolts 77 are positioned such that their outer ends 79 are spaced slightly inward of the inner drum flange 69. The drum bolts 77 do not touch nor extend through the inner drum flange 69.

Nuts 81, 83, 85, and 87 secure to the drum bolts 77 to secure the take-up drum 21 to the wheel 47. Nut 81 locates between inner drum flange 69 and outer support flange 71. Nut 83 locates on one side of inner support flange 75. Nut 85 locates on the inside of inner support flange 75 to tighten against nut 83. Nut 87 locates on the inside of wheel 47.

Referring to FIG. 2, an access hole 89 locates in inner drum flange 69. An access hole 91 locates in outer support flange 71. Access holes 89, 91 are sufficiently large so that an operator may insert his hand and a wrench through them to access the various nuts 81, 83, and 85.

To install the take-up drum 21, normally the drum bolts 77 will be first secured to the outer support flange 71 and inner support flange 75. Nuts 81, 83 and 85 will be tightened in position so that the drum bolts 77 will extend inward for a distance sufficient to pass through the drum bolt holes 55. The operator then lifts the take-up drum 21 and inserts drum bolts 77 through the drum bolt holes 55. The operator then secures the nuts 87 to the drum bolts 77 to secure the take-up drum 21.

The invention has significant advantages. Use of a backhoe boom allows the operator to insert a pulley through a relatively low housing building door. This allows the operator to utilize the backhoe to pull an electrical cable in from an underground conduit. The take-up drum mounts quickly to the tractor. The inner and outer support flanges provide strength to resist the torque and maintain alignment of the drum bolts for easy installation. The bolt heads of the drum bolts do not extend between the inner and outer drum flanges so as to interfere with winding of the pull line. The mounting means for the storage reel allows the pull line to be conveniently wound back onto a storage reel for later use.

While the invention has been shown in only one of its forms, it should be apparent to those skilled in the art that it is not so limited, but is susceptible to various changes without departing from the scope of the invention.

I claim:

1. A method of pulling electrical cable through an underground tubular conduit to an electrical housing building which has side walls with a portal on one of the side walls, the conduit having a second end which terminates within the building and a first end remotely located therefrom, the conduit having been previously threaded with a pull line, the method comprising:

providing a backhoe with a boom and positioning the backhoe outside of the building;

mounting a take-up drum to a rear wheel of the backhoe;

mounting a pulley to an end of the boom;

securing the electrical cable to a first end of the pull line;

reeving a second end of the pull line over the pulley and around the take-up drum;

inserting the end of the boom and the pulley through the portal into the building and positioning the pulley above the second end of the conduit; then rotating the rear wheel to rotate the take-up drum to wrap the pull line around the take-up drum and pull the electrical cable through the conduit; then releasing the pull line from the electrical cable when the electrical cable reaches the second end of the conduit, and withdrawing the boom and pulley from the building; the method further comprising:

releasably mounting a storage drum to the take-up drum for rotation therewith;

after the pull line has been fully wound on the take-up drum, rotating the wheel in a reverse direction and pulling the pull line from the take-up drum; then reeving the pull line on the storage drum and rotating the wheel to wrap the pull line onto the storage drum; then removing the storage drum from the take-up drum.

2. A method of pulling electrical cable through an underground tubular conduit to an electrical housing building which has side walls with a portal on one of the side walls, the conduit having a second end which terminates within the building and a first end remotely located therefrom, the conduit having been previously threaded with a pull line, the method comprising:

providing a backhoe with a boom and positioning the backhoe outside of the building;

mounting a take-up drum to a rear wheel of the backhoe;

mounting a pulley to an end of the boom;

securing the electrical cable to a first end of the pull line;

reeving a second end of the pull line over the pulley and around the take-up drum;

inserting the end of the boom and the pulley through the portal into the building and positioning the pulley above the second end of the conduit; then rotating the rear wheel to rotate the take-up drum to wrap the pull line around the take-up drum and pull the electrical cable through the conduit; then releasing the pull line from the electrical cable when the electrical cable reaches the second end of the conduit, and withdrawing the boom and pulley from the building; and wherein the backhoe is of a type provided with a bucket located on the end of the boom, and wherein the step of mounting a pulley to the end of the boom comprises removing the bucket prior to mounting the pulley.

* * * * *